United States Patent
Chang et al.

(10) Patent No.: US 7,260,959 B2
(45) Date of Patent: Aug. 28, 2007

(54) GLASS HANDLING SYSTEM AND METHOD FOR USING SAME

(75) Inventors: Chester H. Chang, Painted Post, NY (US); Michael Y. Nishimoto, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 345 days.

(21) Appl. No.: 10/928,041

(22) Filed: Aug. 27, 2004

(65) Prior Publication Data

US 2006/0042315 A1    Mar. 2, 2006

(51) Int. Cl.
*C03B 35/00* (2006.01)
(52) U.S. Cl. ............... 65/25.3; 65/182.1; 65/182.2; 65/25.1; 65/25.2
(58) Field of Classification Search ............ 65/25.3, 65/25.1, 25.2, 25.4, 106, 182.2, 182.1
See application file for complete search history.

(56) References Cited

U.S. PATENT DOCUMENTS

| | | | |
|---|---|---|---|
| 3,259,480 A | 7/1966 | Michalik et al. ............. 65/28 |
| 3,293,015 A | 12/1966 | Fredley et al. ............... 65/25 |
| 3,300,291 A | 1/1967 | Misson ........................ 65/159 |
| 3,332,759 A | 7/1967 | McMaster et al. ........... 65/25 |
| 3,332,761 A | 7/1967 | Fredley et al. ............... 65/25 |
| 3,338,696 A | 8/1967 | Dockerty ..................... 65/145 |
| 3,355,275 A | 11/1967 | Sensi et al. .................. 65/99 |
| 4,204,027 A * | 5/1980 | Simon ......................... 428/428 |
| 4,228,993 A * | 10/1980 | Cathers ....................... 271/236 |
| 5,067,762 A | 11/1991 | Akashi ........................ 294/64.3 |
| 6,463,762 B1 * | 10/2002 | Ross, Jr. ..................... 65/105 |
| 6,505,483 B1 * | 1/2003 | Hoetzl et al. ............... 65/25.2 |
| 2003/0029199 A1* | 2/2003 | Pitbladdo ..................... 65/195 |

FOREIGN PATENT DOCUMENTS

| | | |
|---|---|---|
| JP | 2001-353683 | 12/2001 |
| JP | 2002-127070 | 5/2002 |

OTHER PUBLICATIONS

Float Chuck Brochure, Solar Research Laboratory Ltd.
W.M. Whitney, "Theory of the Air-Supported Puck", pp. 306-312.
J.T. Pearson et al., "Experimental Verification of the Gas-Supported Puck Theory", Notes and Discussion, pp. 168-169.
J.U. Jeon et al., "Electrostatic Suspension of Dielectrics", IEEE Transactions on Industrial Electronics, vol. 45, No. 6, Dec. 1998, pp. 938-946.
J. Jin et al., "Direct Electrostatic Levitation and Propulsion", IEEE Transactions on Industrial Electronics, vol. 44, No. 2, Apr. 1997, pp. 234-239.

(Continued)

*Primary Examiner*—Dionne A. Walls
*Assistant Examiner*—Queenie Dehghan
(74) *Attorney, Agent, or Firm*—Christopher Nicastri; William J. Tucker (57) ABSTRACT

A glass handling system and method are described herein where an enhanced robot is used to engage and hold a glass sheet in a manner that minimizes the motion of the glass sheet as it is moved from one point to another point in a glass manufacturing facility. The enhanced robot engages and holds the glass sheet by using one or more suction cups and one or more aero-mechanical devices.

21 Claims, 8 Drawing Sheets

OTHER PUBLICATIONS

Brian O'Shea, "Hovercraft Physics", http://cosmos.used.edu/~bwoshea/personal/hovphysic.html, pp. 1-2.

Nelson Air—Air Beating Primer, http://www.nelsonair.com/NA_primer.htm, pp. 1-5.

* cited by examiner

GLASS HANDLING SYSTEM AND METHOD FOR USING SAME

BACKGROUND OF THE INVENTION

1. Field of the Invention

The present invention relates to a glass handling system and method for using the same to engage and move a glass sheet.

2. Description of Related Art

Today when a glass sheet (e.g., liquid crystal display (LCD) glass sheet) is manufactured a robot is often used to move the glass sheet from one point to another point in a glass manufacturing facility. The robot typically has an end effector which uses suction cups to engage and hold the outside edges or non-quality area of the glass sheet. The suction cups need to engage the glass sheet on the outer edges because if they contact the glass sheet in the center portion of quality area then unacceptable defects or contamination would be created in the glass sheet.

However, as customers require larger and larger glass sheets it becomes increasingly more difficult for the robot to engage and move the glass sheet without causing motion in the center portion of the glass sheet. The motion in the center portion of the glass sheet is caused because there is a long, unsupported span in the middle of the glass sheet that is supported by the suction cups on the moving robot. Of course, the glass sheet can possibly break or even fall off the suction cups if the robot causes too much motion in the glass sheet. One way to minimize the motion in the glass sheet is to limit the speed of the robot. A drawback of this approach is that a large cycle time is required by the robot to move the glass sheet from one point to another point in the glass manufacturing facility. Accordingly, there is a need for a glass handling system that has an enhanced robot which can engage and hold the glass sheet in a manner that minimizes the motion of the glass sheet as it is moved from one point to another point in the glass manufacturing facility. This need and other needs are satisfied by the glass handling system and method of the present invention.

BRIEF DESCRIPTION OF THE INVENTION

The present invention includes a glass handling system and a method that uses an enhanced robot to engage and hold a glass sheet in a manner that minimizes the motion of the glass sheet as it is moved from one point to another point in a glass manufacturing facility. The enhanced robot engages and holds the glass sheet by using one or more suction cups and one or more aero-mechanical devices. The suction cups contact and support the outer edges or non-quality area of the glass sheet while the glass sheet is moved. And, the aero-mechanical device(s) emit gas towards the center portion or quality area of the glass sheet in a manner which enables the aero-mechanical device to support and hold the quality area of the glass sheet without contacting the glass sheet while the glass sheet is moved. The system may also use a temperature control system to regulate a temperature of the gas emitted from the aero-mechanical device towards the glass sheet such that the temperature of the gas emitted from the aero-mechanical device substantially matches a temperature of the glass sheet. In addition, the system may also use a flow control system to control a flow rate of the gas emitted from the aero-mechanical device to help the aero-mechanical device engage the glass sheet and disengage from the glass sheet. Moreover, the system may also use a sheet position control system to control the flow rate and/or the temperature of the gas emitted from the aero-mechanical device so as to control a position of the glass sheet relative to the aero-mechanical device.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Corning Inc. has developed a process known as the fusion process (e.g., downdraw process) which forms high quality thin glass sheets that can be used in a variety of devices like flat panel displays. The fusion process is the preferred technique used today for producing glass sheets that are used in flat panel displays because these glass sheets have surfaces with superior flatness and smoothness when compared to glass sheets produced by other methods. A glass manufacturing system 100 that uses the fusion process to make a glass sheet is briefly described below but for a more detailed description about the fusion process reference is made to U.S. Pat. Nos. 3,338,696 and 3,682,609. The contents of these two patents are incorporated herein by reference.

Figure 1:
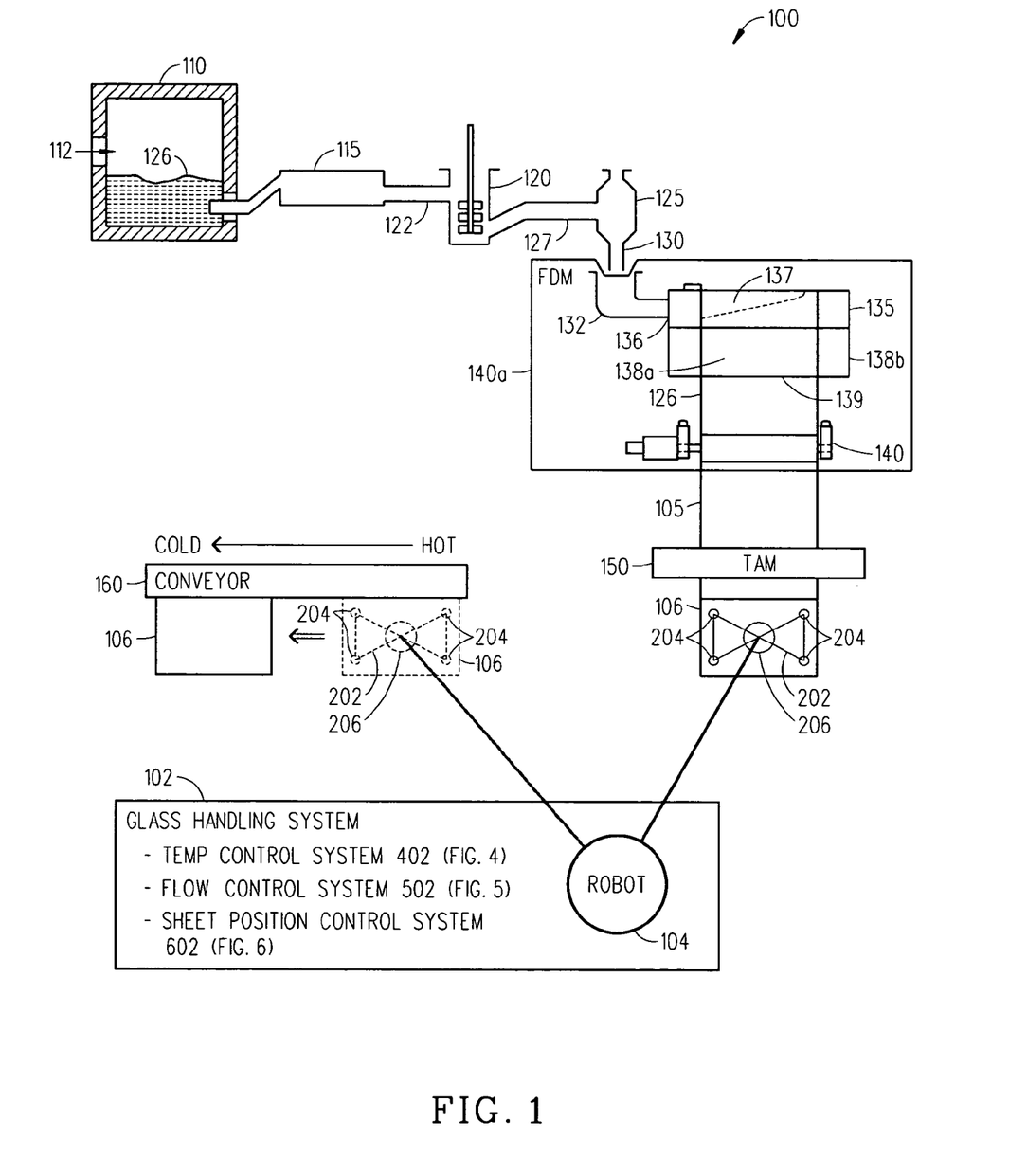
FIG. 1 is a block diagram of an exemplary glass manufacturing system that incorporates a glass handling system which uses an enhanced robot to engage and move a cut glass sheet in accordance with the present invention.

Referring to FIG. 1, there is shown a diagram of an exemplary glass manufacturing system 100 that uses the fusion process and glass handling system 102 of the present invention to make a glass sheet 106. As shown, the glass manufacturing system 100 includes a melting vessel 110, a fining vessel 115, a mixing vessel 120 (e.g., stir chamber 120), a delivery vessel 125 (e.g., bowl 125), a fusion draw machine (FDM) 140a, a traveling anvil machine (TAM) 150, a conveyor 160 and the glass handling system 102. The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127. The delivery vessel 125 delivers the molten glass 126 through a downcomer 130 into the FDM 140a which includes an inlet 132, a forming vessel 135 (e.g., isopipe 135), and a pull roll assembly 140. As shown, the molten glass 126 from the downcomer 130 flows into an inlet 132 which leads to the forming vessel 135 (e.g., isopipe 135). The forming vessel 135 includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the pull roll assembly 140 to form the glass sheet 105. The TAM 150 cuts the drawn glass sheet 105 into distinct pieces of glass sheets 106. At this point, the glass sheet 106 is hot, significantly above room temperature. The glass handling system 102 and in particular an enhanced robot 104 then engages the cut glass sheet 106 and moves the glass sheet 106 from the TAM 150 to the conveyor 160 which is located in a Bottom of the Draw (BOD) area. This area is referred to as the Hot BOD (HBOD) as the glass sheet 106 is still hot. The conveyor 160 then conveys the glass sheet 106 which cools along the way through a couple of process steps. At the end of the conveyor 160 which is referred to as the Cold End, the glass sheet 106 is packaged along with other glass sheets 106 so they can be sent to customers. A detailed discussion about the operation and different components of the glass handling system 102 and enhanced robot 104 is provided below with respect to FIGS. 2-6.

Figure 2A:
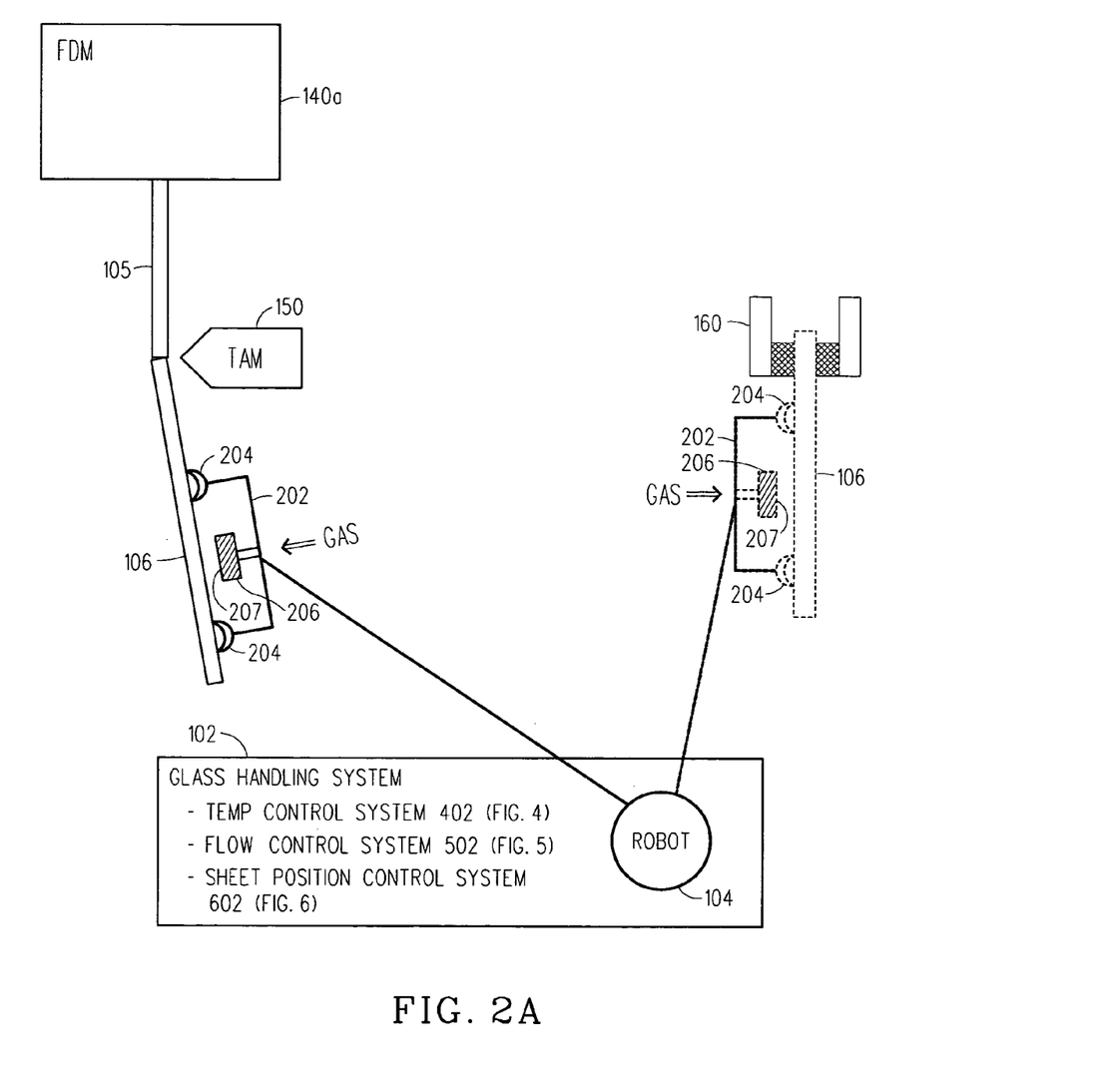
FIGS. 2A and 2B are respectively a side view and a front view of a portion of the glass manufacturing system shown in FIG. 1 which are used to help explain how the enhanced robot can engage and move the cut glass sheet in accordance with the present invention.
Figure 2B:
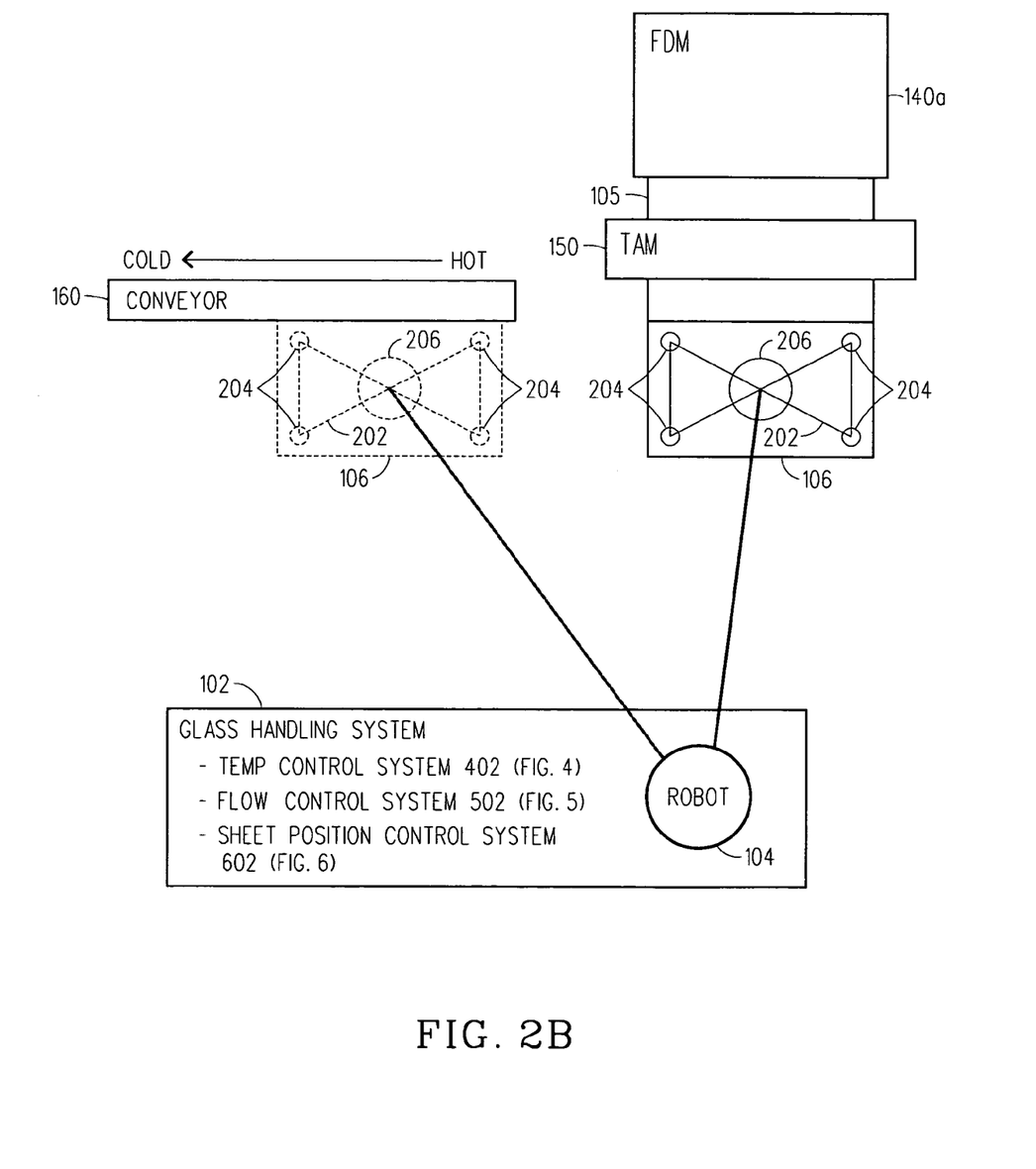

Referring to FIGS. 2A and 2B, there are respectively shown a side view and a front view of a portion of the glass manufacturing system 100 shown in FIG. 1 which are used to help explain how the enhanced robot 104 engages and moves the cut glass sheet 106 from the TAM 150 to the conveyor 160. As shown, the enhanced robot 104 has an end effector 202 that uses four suction cups 204 (for example) and one aero-mechanical device 206 (for example) to grab and hold the vertically orientated glass sheet 106 and then move the vertically orientated glass sheet 106 from the TAM 150 to the conveyor 160. The suction cups 204 contact and support the outer edges or non-quality area of the vertically orientated glass sheet 106. And, the aero-mechanical device 206 (e.g., float chuck 206) receives gas from a gas supply unit 412 (see FIG. 4) and emits gas towards the center portion or quality area of the glass sheet 106 in a manner which enables the aero-mechanical device 206 to support and hold the center portion of the vertically orientated glass sheet 106 without contacting the quality area of the vertically orientated glass sheet 106 while the vertically orientated glass sheet 106 is moved from the TAM 150 to the conveyor 160. A description as to how the aero-mechanical device 206 is able to engage and hold the quality area of the glass sheet 106 without contacting the quality area of the glass sheet 106 is provided below with respect to FIGS. 3A and 3B.

Figure 3A:
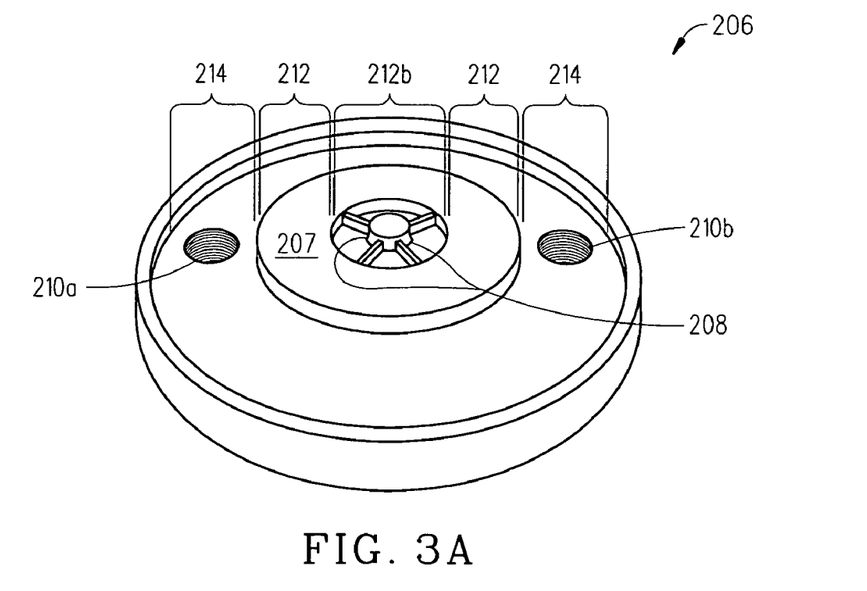
FIGS. 3A and 3B are respectively a perspective view and a side view of an exemplary aero-mechanical device that can be used by the enhanced robot shown in FIGS. 1 and 2 to help engage and move the cut glass sheet in accordance with the present invention.
Figure 3B:
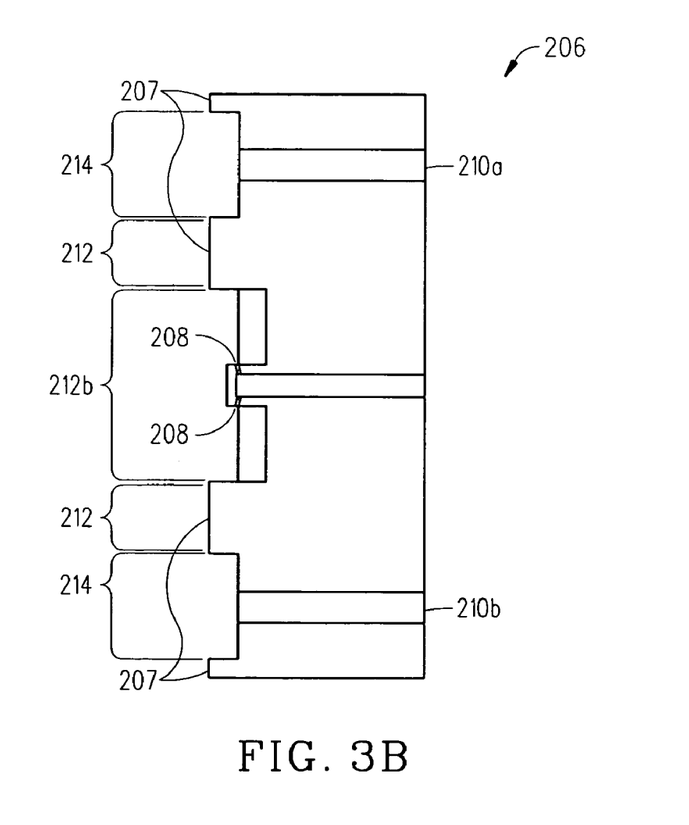

Referring to FIGS. 3A and 3B, there are respectively a perspective view and a side view of an exemplary aero-mechanical device 206 that is similar to a device known as a float chuck which is made and sold by Solar Research Labs. The aero-mechanical device 206 is configured such that the gas from a gas supply unit 412 (see FIG. 4) flows through it in a manner so as to create a gas film on one side of the glass sheet 106 such that if the glass sheet 106 moves too far away from a face 207 of the aero-mechanical device 206 then a suction force (Bernoulli suction force) created by gas emitted from the aero-mechanical device 206 pulls the glass sheet 106 back to the aero-mechanical device 206. And, if the glass sheet 106 moves too close to the face 207 of the aero-mechanical device 206 then a repulsive force caused by the gas emitted from the aero-mechanical device 206 pushes the glass sheet 106 away from the aero-mechanical device 206. It is the balance between the suction force and the repulsion force that enables the aero-mechanical device 206 to hold the glass sheet 106 from a single side at a given position without having to touch the glass sheet 106.

As shown, the aero-mechanical device 206 has holes 208 in which the gas is supplied and two holes 210a and 210b through which the gas is exhausted. The aero-mechanical device 206 also has a land portion 212, a center portion 212b, and a cavity portion 214. Essentially, the aero-mechanical device 206 is configured such that as the gas flows through a small gap between the glass sheet 106 and the face 207 of the aero-mechanical device 206 in the land portion 212, it flows faster, increasing the dynamic pressure $\rho U^2$ where $\rho$ is the gas density and U is the gas velocity. The increase in the dynamic pressure $\rho U^2$ means that the static pressure P is reduced in accordance with the Bernoulli equation which states $P+\rho U^2=0$. It is this reduction in static pressure P which generates a negative pressure or vacuum by which the aero-mechanical device 206 can actually grab and hold the glass sheet 106. The center portion 212b holds a volume of pressurized gas introduced through holes 208. This center portion 212b acts as a pressure pad which repels the glass sheet 106. The balance between the suction force generated by the land portion 212 and the repelling force generated by the center portion 212b yields a net force upon the glass sheet 106. It should be appreciated that there are other configurations that the aero-mechanical device 206 can have besides the configuration shown in FIGS. 3A and 3B. For a detailed description of some of the different configurations of the aero-mechanical device 206 reference is made to JP 2001-353683 and U.S. Pat. No. 5,067,762. The contents of these patents are incorporated by reference herein.

To assist the enhanced robot 104 and in particular the aero-mechanical device 206 in handling the glass sheet 106, the gas exiting the aero-mechanical device 206 should be heated to match the temperature of the glass sheet 106 which cools as it is moved from the TAM 150 to the conveyor 160 to avoid the creation of a temporary warp in the glass sheet 106. This is particularly true for glass sheets 106 of non-uniform thickness such as those with beads along the vertical edges as typically produced by a fusion draw machine 140a. Experiments have indicated that a significant amount of warp in the glass sheet 106 can be thermally induced when the temperature of the gas exiting the aero-mechanical device 206 does not match the temperature of the glass sheet 106. This temporary warp can dramatically reduce the effectiveness of the aero-mechanical device 206. Thermally induced warp in the glass sheet 106 may also alter the interaction between the suction cups 204 and the glass sheet 106. In addition, thermally induced warp in the glass sheet 106 may create stress which could cause a crack to propagate within the cut glass sheet 106. This crack could originate from a flaw along one of the edges of the sheet 106 or from any flaws within the body of the glass sheet 106. In addition, thermally induced stress due to temperature gradients within the glass sheet 106 may cause a crack to propagate through the cut glass sheet 106.

To address this concern, the glass handling system 102 includes a temperature control system 402 that can regulate the temperature of the gas emitted from the aero-mechanical device 206 towards the glass sheet 106 such that the temperature of the gas emitted from the aero-mechanical device 206 substantially matches the current temperature of the glass sheet 106. Again, it should be noted that the glass sheet 106 constantly cools as it is moved by the enhanced robot 104 from the TAM 150 to the conveyor 160. As such, the temperature control system 402 needs to constantly reduce the temperature of the gas that is emitted from the aero-mechanical device 206 to match the temperature of the moving glass sheet 106. A detailed discussion as to how the temperature control system 402 can regulate the temperature of the gas emitted from the aero-mechanical device 206 is provided below with respect to FIG. 4.

Figure 4:
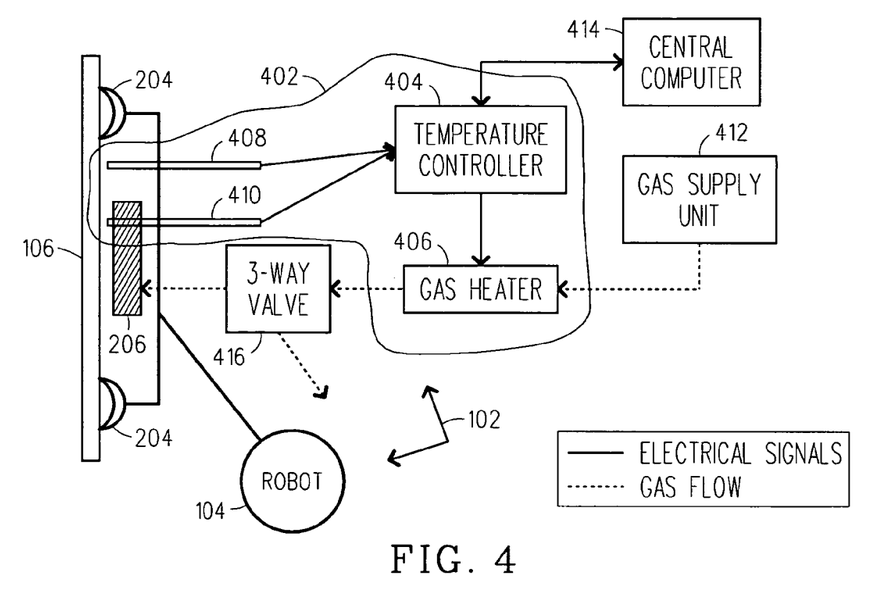
FIG. 4 is a block diagram illustrating the basic components of a first embodiment of the glass handling system shown in FIGS. 1 and 2 that uses a temperature control system in addition to the enhanced robot to help engage and move the cut glass sheet in accordance with the present invention.

Referring to FIG. 4, there is a block diagram illustrating the basic components of a first embodiment of the glass handling system 102 which includes the enhanced robot 104 and the temperature control system 402. As shown, the temperature control system 402 includes a temperature controller 404, a gas heater 406 and two temperature measuring devices 408 and 410. The first temperature measuring device 408 measures a temperature of the glass sheet 106. And, the second temperature measuring device 410 measures a temperature of the glass sheet 106 at a location substantially identical to the area impinged upon by gas emitted from the aero-mechanical device 206. Alternatively, the second temperature measuring device 410 can measure a temperature of the gas emitted from the aero-mechanical device 206. The temperature controller 404 receives the measured temperatures from both of the temperature measuring devices 408 and 410 and then controls a set-point on the gas heater 406 to heat the gas received from a gas supply unit 412 such that the temperature of the gas emitted from the aero-mechanical device 206 substantially matches so it is the same as or a little more or a little less than the current temperature of the glass sheet 106. In practice, the temperature of the gas emitted from the aero-mechanical device 206 may be somewhat less than the current temperature of the glass sheet 106 so as to equal the cooling provided by natural convection to the remainder of the glass sheet 106. Another purpose of the temperature control system 402 can be to help constrain the motion of the glass sheet 106 during the engagement period with the enhanced robot 104 (see FIGS. 7 and 8).

In the preferred embodiment, the first and second temperature measuring devices 408 and 410 are located on the same side of the glass sheet 106 as the aero-mechanical device 206. The first temperature measuring device 408 should not contact the glass sheet 106 and should be located in an area not affected by the gas emitted from the aero-mechanical device 206. And, the second temperature measuring device 410 should not contact the glass sheet 106 and should be located in an area that is affected by the gas emitted from the aero-mechanical device 206. Of course, the temperature measurement of the thermal impact of the aero-mechanical device 206 (gas temperature exiting air device or glass temperature) should be precise. Assuming, the gas exit temperature is used as the feedback metric, it will need to be "calibrated" to the temperature of the glass sheet 106 to properly program the temperature controller 104.

Also in the preferred embodiment, the gas heater 406 should be one that is capable of altering the gas temperature exiting the aero-mechanical device 206 to nearly instantaneously match the current temperature of the glass sheet 106. This means that the gas heater 406 should have a low thermal inertia and relatively low response time as the temperature of the glass sheet 106 can drop very fast. Of course, the gas heater 406 should not generate or transport particulates or other contaminants to the surface of the glass sheet 106.

A central computer 414 (optional) is also shown in FIG. 4 which can be used to help control the temperature controller 404 and can also be used to help control the operation of an optional three-way valve 416. The three-way valve 416 can be controlled to permit the gas emitted from the gas heater 406 to enter or bypass the aero-mechanical device 206. The three-way valve 416 would be configured to bypass or prevent the gas from entering the aero-mechanical device 206 when glass sheets 106 are not being produced so as to reduce the effect upon the environment near the TAM 150. The three-way valve 416 can also be configured to bypass or prevent the gas from entering the aero-mechanical device 206 when the device 206 approaches the drawn glass sheet 105 below the TAM 150 as well as when the device 206 releases the cut glass sheet 106 to the conveyor. Alternatively, the three-way valve 416 can be manually operated.

Figure 5:
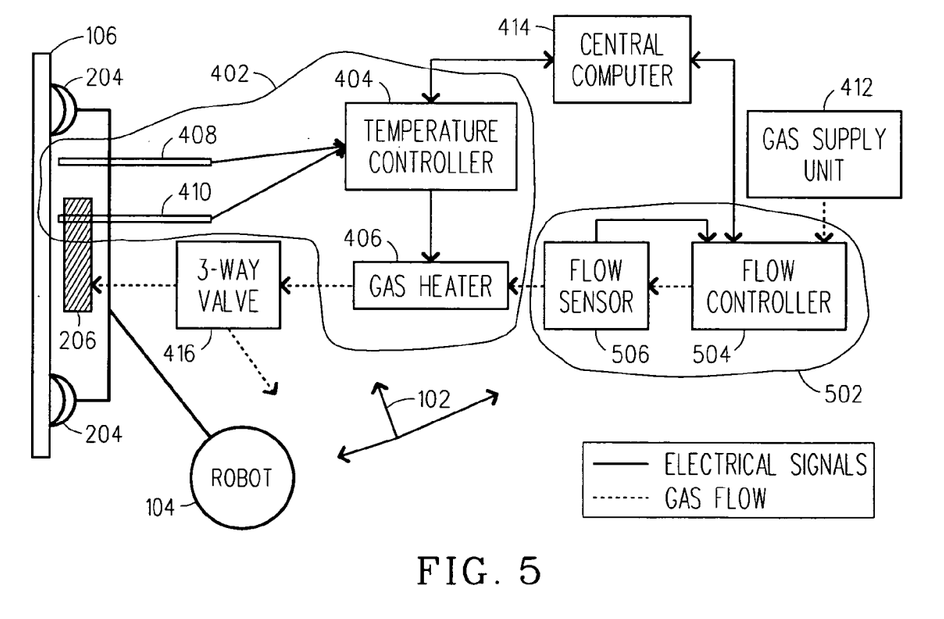
FIG. 5 is a block diagram illustrating the basic components of a second embodiment of the system shown in FIGS. 1 and 2 that uses a flow control system in addition to the enhanced robot and the temperature control system to help engage and move the cut glass sheet in accordance with the present invention.

Referring to FIG. 5, there is a block diagram illustrating the basic components of a second embodiment of the glass handling system 102 which includes a flow control system 502 in addition to the enhanced robot 104 and the temperature control system 402. As shown, the flow control system 502 includes a flow controller 504 and a flow sensor 506 which function together to control the flow rate of the gas emitted from the aero-mechanical device 206. The flow control system 502 is helpful in several ways. First, it can be utilized when the enhanced robot 104 engages the glass sheet 106 and when it disengages from the glass sheet 106. During the engagement process, the flow controller 504 can gradually increase the flow of gas to the aero-mechanical device 206 to move the glass sheet 106 smoothly towards the aero-mechanical device 206. And, during the disengagement process, the flow controller 504 can gradually decrease the flow of gas to the aero-mechanical device 206 to move the glass sheet 106 smoothly away from the aero-mechanical device 206. This type of flow control may be preferable since if one merely cycles the gas on and off to the aero-mechanical device 206 then the glass sheet 106 could move rapidly towards the aero-mechanical device 206 and produce contact damage. Secondly, the control of the flow of gas could also be used to fine tune the position of the glass sheet 106 relative to the aero-mechanical device 206. The central computer 414 can be used to control the operation of the flow controller 504.

Figure 6:
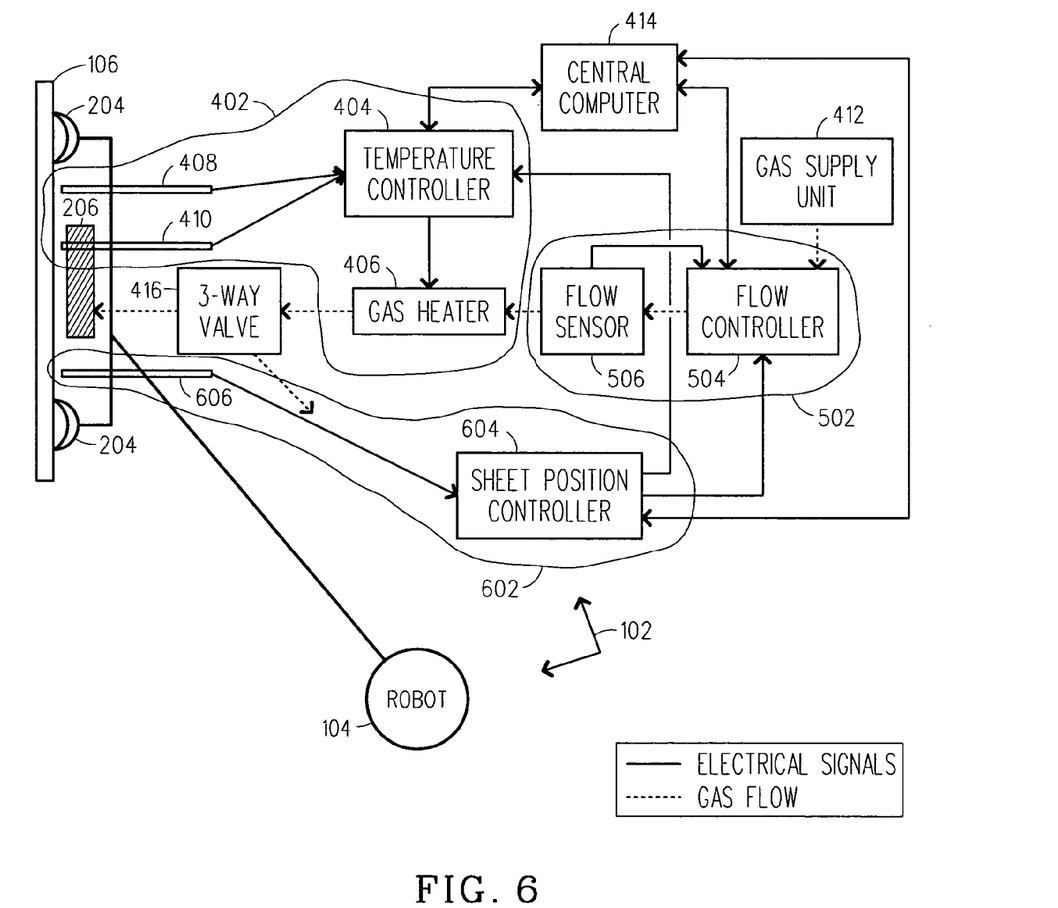
FIG. 6 is a block diagram illustrating the basic components of a third embodiment of the glass handling system shown in FIGS. 1 and 2 that uses a sheet position control system in addition to the enhanced robot, the temperature control system and the flow control system to help engage and move the cut glass sheet in accordance with the present invention.

Referring to FIG. 6, there is a block diagram illustrating the basic components of a third embodiment of the glass handling system 102 which includes a sheet position control system 602 in addition to the enhanced robot 104, the temperature control system 402 and the flow control system 502. As shown, the sheet position control system 602 includes a sheet position controller 604 and a position sensor 606 which function together to control the flow rate and/or temperature of the gas emitted from the aero-mechanical device 206 so as to control the position of the glass sheet 106 relative to the aero-mechanical device 206. In operation, the sheet position controller 604 receives a signal from the position sensor 606 that indicates the position of the glass sheet 106 and then sends one or more control signals to the flow controller 502 and/or the temperature controller 402 to control and change the position of the glass sheet 106 relative to the aero-mechanical device 206. In this way, the sheet position controller 604 can control the magnitude of the gap between the glass sheet 106 and the aero-mechanical device 206. The central computer 414 can be used to control the operation of the sheet position controller 604.

This method of controlling the position of the glass sheet 106 can be used to improve upon the original application where the enhanced robot 104 is used to engage and move the glass sheet 106. In particular, the sheet position controller 604 can be used to control the force produced by the aero-mechanical device 206 to hold the glass sheet 106 in a fixed position with respect to the face 207 of the aero-mechanical device 206 while taking into account changes in the load in a direction normal to the moving glass sheet 106. This load includes the gravitational force that is created when the enhanced robot 104 moves and tilts the glass sheet 106 through a variety of angles. This load also includes the aerodynamic drag which is created when the enhanced robot 104 moves and tilts the glass sheet 106 through air at varying speeds.

In addition to controlling the position of the glass sheet 106, the sheet position control system 602 can be used to intentionally impose a small degree of thermally induced warp into the glass sheet 106 to create a structure which stiffens so as to reduce the motion of the glass sheet 106 due to external influences. For instance, a flat glass sheet 106 can deflect easily under a small force but one that is bowed has a higher effective stiffness. As such, so long as the amount of warp induced does not exceed the limit of the aero-mechanical device 206 and the suction cups 204, then the temporary bow imposed may help reduce the motion of the glass sheet 106 caused by external influences.

Figure 7:
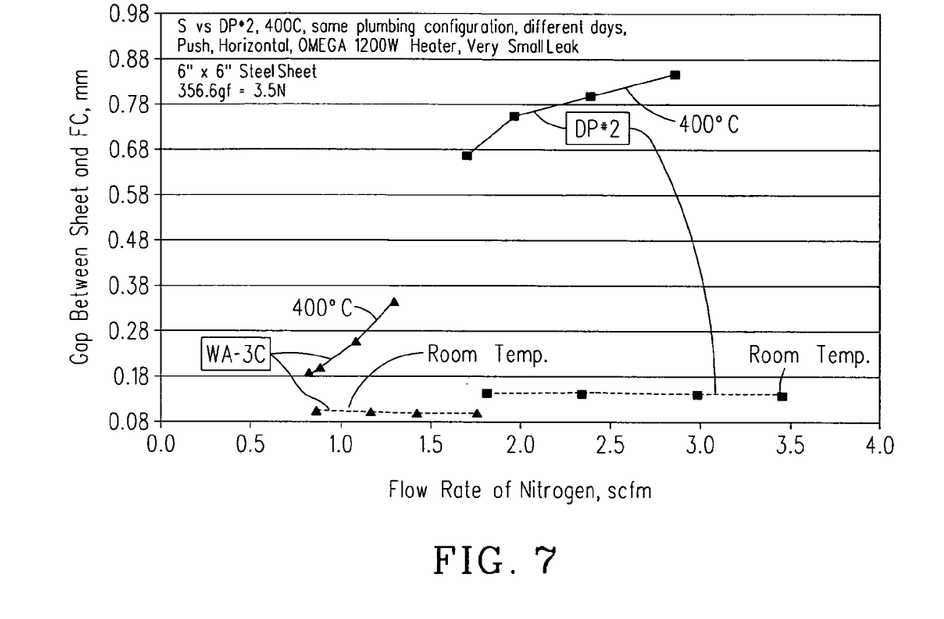
FIG. 7 is a graph that shows the results of an experiment which indicates the relationship between the flow rate of gas emitted from two exemplary aero-mechanical devices and the gap between an exemplary steel plate that is being levitated by one of the two exemplary aero-mechanical devices.

Referring to FIG. 7, there is a graph that shows the results of an experiment indicating the relationship between the flow rate of gas emitted from two exemplary aero-mechanical devices 206 (labeled as WA-3C and DP#2) and the gap between an exemplary steel plate that is being levitated by one of the exemplary aero-mechanical devices 206. The exemplary aero-mechanical device 206 labeled as WA-3C is a model of a float chuck made by Solar Research Labs (see FIGS. 3A and 3B). And, the exemplary aero-mechanical device 206 labeled as DP#2 is a custom float chuck made by Solar Research Labs which is very similar in shape to WA-3C but has smaller diameter holes 208 (see FIGS. 3A and 3B). In this experiment, the steel sheet and float chucks 206 were oriented horizontally with the steel sheet located above the float chucks 206. The solid line refers to the gap at different flowrates for gas heated to 400° C. The dashed line is for unheated nitrogen.

Figure 8:
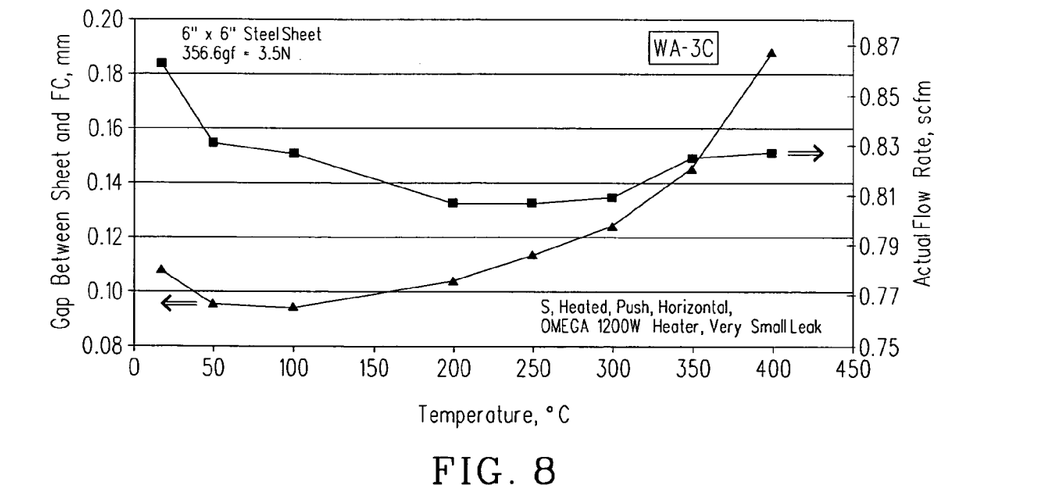
FIG. 8 is a graph that shows the results of an experiment which indicates the relationship between the temperature (° C.) of the gas emitted from an exemplary aero-mechanical device and the gap between an exemplary steel plate that is being levitated by the exemplary aero-mechanical device.

Referring to FIG. 8, there is a graph that shows the results of an experiment indicating the relationship between the temperature (° C.) of the gas emitted from an exemplary aero-mechanical device 206 (labeled as WA-3C) and the gap between an exemplary steel plate that is being levitated by the exemplary aero-mechanical device 206. Like in the previous experiment, the steel sheet and float chuck 206 were oriented horizontally with the steel sheet located about the float chuck 206. In the graph, the bottom line indicates the gap between the steel plate and the float chuck 206 as a function of gas temperature. And, the top line represents the flow rate of the gas delivered by the gas heater. As can be seen, when the gas temperature rises, for equivalent delivery flowrate (at unheated temperature), then the gap increases.

Figure 9:
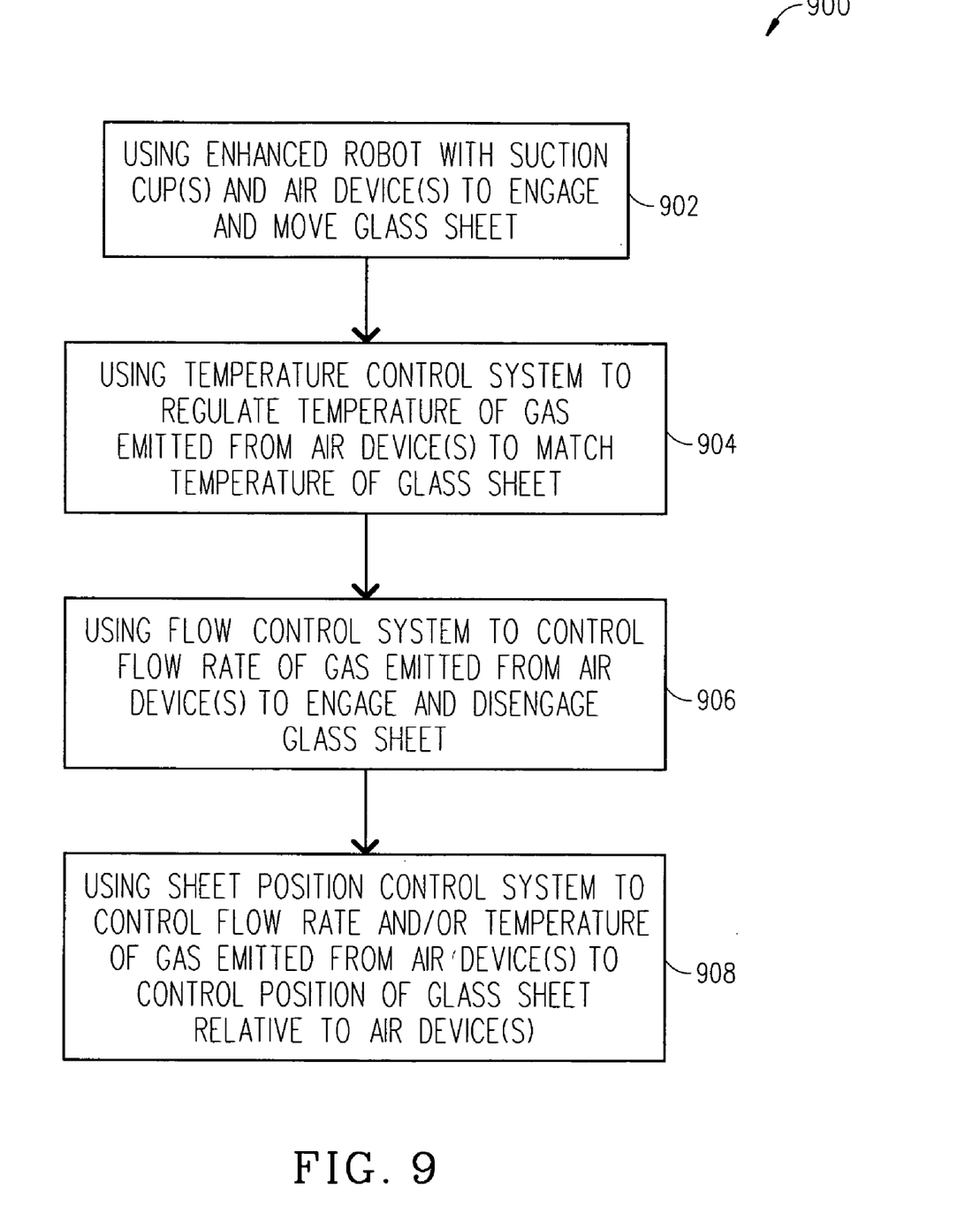
FIG. 9 is a flowchart illustrating the basic steps of a preferred method for engaging and moving a glass sheet from one point to another point in the glass manufacturing facility in accordance with the present invention.

Referring to FIG. 9, there is a flowchart illustrating the basic steps of a preferred method 900 for engaging and moving a glass sheet 106 in accordance with the present invention. Beginning at step 902, the enhanced robot 104 also engages and moves the glass sheet 106 by using at least one suction cup 204 that contacts and holds the outer edges or non-quality area of the glass sheet 106. The enhanced robot 104 engages and moves the glass sheet 106 by using at least one aero-mechanical device 206 that emits gas towards the center portion or quality area of the glass sheet 106 in a manner which enables the aero-mechanical device 206 to support and hold the quality area of the glass sheet 106 without contacting the quality area of the glass sheet 106.

At step 904, the temperature control system 402 can be used to regulate a temperature of the gas emitted from the aero-mechanical device 206 towards the glass sheet 106 such that the temperature of the gas emitted from the aero-mechanical device 206 substantially matches a temperature of the glass sheet 106. A detailed discussion about an exemplary temperature control system 402 was described above with respect to FIG. 4.

At step 906, the flow control system 502 can be used to control the flow rate of the gas emitted from the aero-mechanical device 206 so the aero-mechanical device 206 can effectively engage the glass sheet 106 and disengage from the glass sheet 106. A detailed discussion about an exemplary flow control system 502 was described above with respect to FIG. 5.

At step 908, the sheet position control system 602 can be used to control a flow rate and/or temperature of the gas emitted from the aero-mechanical device 206 so as to control a position of the glass sheet 106 relative to the aero-mechanical device 206. A detailed discussion about a sheet position control system 602 was described above with respect to FIG. 6.

From the foregoing, it can be readily appreciated by those skilled in the art that the glass handling system 102 that has an enhanced robot 104 which uses the suction cups 204 and the aero-mechanical device 206 to engage and move the glass sheet 106 is a marked improvement over the traditional robot that simply used suction cups to engage and move the glass sheet 106. This improvement is possible because the enhanced robot 104 is able to engage and hold the center portion of the glass sheet 106 as well as the outer edges of the glass sheet 106 whereas the traditional robot can only engage and hold the outer edges of the glass sheet 106.

Some of the additional features, advantages and uses of the present invention are as follows:

Another benefit of the present invention can be seen in the snap-off process at the TAM 150. In the snap-off process, the traditional robot grabbed and rotated the scored glass sheet 106 to create bend stress at a score line. Because the traditional robot supported only the edges of the glass sheet 106, then the bending of the glass sheet 106 started there. And, the flexible nature of the glass sheet 106 caused a "lag" in the bend angle at the center of the glass sheet 106 relative to the score line. Since the stress that separates the cut glass sheet 106 starts at the edges of the glass sheet 106, away from the score line, the center of the glass sheet 106 needed to be bent to the critical angle before the crack propagated. Thus, the edges of the glass sheet 106 were bent further than is necessary to start the crack. The enhanced robot 104 addresses this problem by supporting the middle of the glass sheet 106 with a non-contact device 206 near the score line during the snap-off process. The use of the non-contact device 206 also reduces the motion of the glass sheet 106 during the snap-off process. This may have a benefit for sheet cleanliness as it reduces the likelihood of the horizontal edges of the cut sheet 106 and the drawn sheet 105 rubbing against each other as the sheets change shape before they can be moved apart.

It should be appreciated that there are many different types of aero-mechanical devices 206 that can be used in the present invention besides the one shown in FIGS. 3A and 3B. For instance, the aero-mechanical device 206 can be any air device that can restrict the motion of the glass sheet 106 without touching the glass sheet 106. This includes air pads which, although they only operate in one direction (pushing), can be positioned to restrict the motion of the glass sheet 106 in the direction to one side of its neutral position. Also, it should be appreciated that the aero-mechanical device 206 can use any gas although nitrogen and air are preferred due to their availability and cost.

Although the glass handling system 102 was described herein as being used in a glass manufacturing system 100 where the enhanced robot 104 moves the glass sheet 106 from a TAM 150 to a conveyor 160, it should be appreciated that this type of system can be used in any application where a robot is needed to move any type of sheet (e.g., glass sheet, metal sheet). It should also be appreciated that the present invention can be used in any application where an aero-mechanical device is used and the exit temperature of the process gas differs from ambient conditions to substantially match the temperature of the piece being handled.

It should be appreciated that the enhanced robot 104 can have an end-effector 202 that uses any number of suction cup(s) 204 and/or aero-mechanical device(s) 206 to engage a glass sheet 106 in accordance with the present invention.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A system for engaging and moving a glass sheet, said system comprising:
    a robot including:
        a suction cup for contacting and holding a non-quality area of the glass sheet; and
        an aero-mechanical device for emitting gas towards a quality area of the glass sheet which enables said aero-mechanical device to support and hold the quality area of the glass sheet without contacting the quality area of the glass sheet; and
    a temperature control system for regulating a temperature of the gas emitted from said aero-mechanical device towards the glass sheet.

2. The system of claim 1, wherein said temperature control system includes:
    a gas heater;
    a first temperature measuring device for measuring the temperature of the glass sheet in a region unaffected by said aero-mechanical device;
    a second temperature measuring device for measuring the temperature of the glass sheet in a region affected by the aero-mechanical device; and
    a temperature controller for receiving the measured temperatures from said first and second temperature measuring devices and then controlling a set-point on said gas heater to heat gas received from a gas supply unit such that the temperature of the heated gas that is emitted from said aero-mechanical device substantially matches the temperature of the glass sheet.

3. The system of claim 1, wherein said temperature control system includes:
    a gas heater;
    a first temperature measuring device for measuring the temperature of the glass sheet in a region unaffected by said aero-mechanical device;
    a second temperature measuring device for measuring the temperature of the gas emitted from said aero-mechanical device; and
    a temperature controller for receiving the measured temperatures from said first and second temperature measuring devices and then controlling a set-point on said gas heater to heat gas received from a gas supply unit such that the temperature of the heated gas that is emitted from said aero-mechanical device substantially matches the temperature of the glass sheet.

4. The system of claim 1, further comprising a flow control system for controlling a flow rate of the gas emitted from said aero-mechanical device such that said aero-mechanical device can engage the glass sheet and disengage from the glass sheet.

5. The system of claim 4, wherein said flow control system includes:
    a flow measuring device for measuring the flow rate of gas emitted from a glass supply unit;
    a flow controller for receiving the measured flow rate from said flow measuring device and then controlling the flow rate of the gas emitted from said aero-mechanical device such that said aero-mechanical device can engage the glass sheet and disengage from the glass sheet.

6. The system of claim 1, further comprising a sheet position control system for controlling a flow rate and/or temperature of the gas emitted from said aero-mechanical device so as to control a position of the glass sheet relative to said aero-mechanical device.

7. The system of claim 6, wherein said sheet position control system includes:
    a position sensor for measuring the position of the glass sheet relative to said aero-mechanical device;

a sheet position controller for receiving the measured position of the glass sheet from said position sensor and then controlling the flow rate and/or temperature of the gas emitted from said aero-mechanical device so as to control the position of the glass sheet relative to said aero-mechanical device.

8. The system of claim 1, wherein said aero-mechanical device has a central portion that emits gas so as to create a gas film on one side of the glass sheet such that if the glass sheet moves too far away from a face of said aero-mechanical device then a Bernoulli suction force caused by the emitted gas which is flowing over a land portion of said aero-mechanical device pulls the glass sheet closer to said aero-mechanical device and if the glass sheet moves too close to the face of said aero-mechanical device then a repulsive force caused by the gas emitted from said central portion pushes the glass sheet away from said aero-mechanical device.

9. A method for engaging and moving a substantially vertically orientated glass sheet, said method comprising the steps of:
    engaging the glass sheet by using a robot which includes:
        a suction cup that contacts and holds a non-quality area of the substantially vertically orientated glass sheet;
        an aero-mechanical device that emits gas towards a quality area of the substantially vertically orientated glass sheet which enables said aero-mechanical device to support and hold the quality area of the substantially vertically orientated glass sheet without contacting the quality area of the substantially vertically orientated glass sheet; and
        said aero-mechanical device has a central portion that emits gas so as to create a gas film on one side of the substantially vertically orientated glass sheet such that if the substantially vertically orientated glass sheet moves too far away from a face of said aero-mechanical device then a Bernoulli suction force caused by the emitted gas which is flowing over a land portion of said aero-mechanical device pulls the substantially vertically orientated glass sheet closer to said aero-mechanical device and if the substantially vertically orientated glass sheet moves too close to the face of said aero-mechanical device then a repulsive force caused by the gas emitted from said central portion pushes the substantially vertically orientated glass sheet away from said aero-mechanical device;
    moving the substantially vertically orientated glass sheet by using the robot; and
    using a temperature control system that regulates a temperature of the gas emitted from said aero-mechanical device towards the substantially vertically orientated glass sheet.

10. The method of claim 9, wherein said temperature control system includes:
    a gas heater;
    a first temperature measuring device for measuring the temperature of the substantially vertically orientated glass sheet in an area close to, but unaffected by the aero-mechanical device;
    a second temperature measuring device for measuring the temperature of the substantially vertically orientated glass sheet in a region directly affected by the aero-mechanical; and
    a temperature controller for receiving the measured temperatures from said first and second temperature measuring devices and then controlling a set-point on said gas heater to heat gas received from a gas supply unit such that the temperature of the heated gas that is emitted from said aero-mechanical device substantially matches the temperature of the substantially vertically orientated glass sheet.

11. The method of claim 9, wherein said temperature control system includes:
    a gas heater;
    a first temperature measuring device for measuring the temperature of the substantially vertically orientated glass sheet in a region unaffected by said aero-mechanical device;
    a second temperature measuring device for measuring the temperature of the gas emitted from said aero-mechanical device; and
    a temperature controller for receiving the measured temperatures from said first and second temperature measuring devices and then controlling a set-point on said gas heater to heat gas received from a gas supply unit such that the temperature of the heated gas that is emitted from said aero-mechanical device substantially matches the temperature of the substantially vertically orientated glass sheet.

12. The method of claim 9, further comprising the step of using a flow control system that controls a flow rate of the gas emitted from said aero-mechanical device such that said aero-mechanical device can engage the substantially vertically orientated glass sheet and disengage from the substantially vertically orientated glass sheet.

13. The method of claim 12, wherein said flow control system includes:
    a flow measuring device for measuring the flow rate of gas emitted from a glass supply unit;
    a flow controller for receiving the measured flow rate from said flow measuring device and then controlling the flow rate of the gas emitted from said aero-mechanical device such that said aero-mechanical device can engage the substantially vertically orientated glass sheet and disengage from the substantially vertically orientated glass sheet.

14. The method of claim 9, further comprising the step of using a sheet position control system to control a flow rate and/or temperature of the gas emitted from said aero-mechanical device so as to control a position of the substantially vertically orientated glass sheet relative to said aero-mechanical device.

15. The method of claim 14, wherein said sheet position control system includes:
    a position sensor for measuring the position of the substantially vertically orientated glass sheet relative to said aero-mechanical device;
    a sheet position controller for receiving the measured position of the substantially vertically orientated glass sheet from said position sensor and then controlling the flow rate and/or temperature of the gas emitted from said aero-mechanical device so as to control the position of the substantially vertically orientated glass sheet relative to said aero-mechanical device.

16. A glass manufacturing system comprising:
    at least one vessel for melting batch materials and forming molten glass;
    an isopipe for receiving the molten glass and forming a glass sheet;
    a draw machine for drawing the glass sheet;
    a cutting machine for cutting the drawn glass sheet; and a system for engaging and moving the cut glass sheet while the cut glass sheet is substantially vertically orientated, said system including:
   a robot including:
      a suction cup for contacting and holding a non-quality area of the substantially vertically orientated glass sheet;
      an aero-mechanical device for emitting gas towards a quality area of the substantially vertically orientated glass sheet which enables said aero-mechanical device to support and hold the quality area of the substantially vertically orientated glass sheet without contacting the quality area of the substantially vertically orientated glass sheet;
      said aero-mechanical device has a central portion that emits gas so as to create a gas film on one side of the substantially vertically orientated glass sheet such that if the substantially vertically orientated glass sheet moves too far away from a face of said aero-mechanical device then a Bernoulli suction force caused by the emitted gas which is flowing over a land portion of said aero-mechanical device pulls the substantially vertically orientated glass sheet closer to said aero-mechanical device and if the substantially vertically orientated glass sheet moves too close to the face of said aero-mechanical device then a repulsive force caused by the gas emitted from said central portion pushes the substantially vertically orientated glass sheet away from said aero-mechanical device; and
   a temperature control system for regulating a temperature of the gas emitted from said aero-mechanical device towards the substantially vertically orientated glass sheet such that the temperature of the gas emitted from said aero-mechanical device substantially matches a temperature of the substantially vertically orientated glass sheet.

17. The glass manufacturing system of claim 16, wherein said system further includes a flow control system for controlling a flow rate of the gas emitted from said aero-mechanical device such that said aero-mechanical device can engage the substantially vertically orientated glass sheet and disengage from the substantially vertically orientated glass sheet.

18. The glass manufacturing system of claim 16, wherein said system further includes a sheet position control system for controlling a flow rate and/or temperature of the gas emitted from said aero-mechanical device so as to control a position of the substantially vertically orientated glass sheet relative to said aero-mechanical device.

19. A method for manufacturing a glass sheet, said method comprising the steps of:
   melting batch materials to form molten glass and processing the molten glass to form the glass sheet;
   drawing the glass sheet;
   cutting the drawn glass sheet; and
   engaging and moving the cut glass sheet while the cut glass sheet is substantially vertically orientated by using a system that includes:
      a robot including:
         a suction cup that contact and holds a non-quality area of the substantially vertically orientated glass sheet;
         an aero-mechanical device that emits gas towards a quality area of the substantially vertically orientated glass sheet which enables said aero-mechanical device to support and hold the quality area of the substantially vertically orientated glass sheet without contacting the quality area of the substantially vertically orientated glass sheet; and
         said aero-mechanical device has a central portion that emits gas so as to create a gas film on one side of the substantially vertically orientated glass sheet such that if the substantially vertically orientated glass sheet moves too far away from a face of said aero-mechanical device then a Bernoulli suction force caused by the emitted gas which is flowing over a land portion of said aero-mechanical device pulls the substantially vertically orientated glass sheet closer to said aero-mechanical device and if the substantially vertically orientated glass sheet moves too close to the face of said aero-mechanical device then a repulsive force caused by the gas emitted from said central portion pushes the substantially vertically orientated glass sheet away from said aero-mechanical device; and
      a temperature control system that regulates a temperature of the gas emitted from said aero-mechanical device towards the substantially vertically orientated glass sheet such that the temperature of the gas emitted from said aero-mechanical device substantially matches a temperature of the substantially vertically orientated glass sheet.

20. The method of claim 19, wherein said system further includes a flow control system for controlling a flow rate of the gas emitted from said glass supply unit such that said aero-mechanical device can either engage the substantially vertically orientated glass sheet and disengage from the substantially vertically orientated glass sheet.

21. The method of claim 19, wherein said system further includes a sheet position control system for controlling a flow rate and/or temperature of the gas emitted from said aero-mechanical device so as to control a position of the substantially vertically orientated glass sheet relative to said aero-mechanical device.

* * * * *